Jan. 25, 1966  C. D. COFFEY  3,231,193
AUTOMATIC GAS FLOW CONTROL DEVICE
Filed April 20, 1964  6 Sheets-Sheet 1

INVENTOR.
CHARLES D. COFFEY
BY
Albert M. Herzig
ATTORNEY.

Jan. 25, 1966     C. D. COFFEY     3,231,193
AUTOMATIC GAS FLOW CONTROL DEVICE Filed April 20, 1964     6 Sheets-Sheet 2

FIG. 3.

INVENTOR.
CHARLES D. COFFEY
BY Albert M. Herzig
ATTORNEY.

INVENTOR.
CHARLES D. COFFEY
BY
Albert M. Herzig
ATTORNEY

FIG. 14.

INVENTOR.
CHARLES D. COFFEY

United States Patent Office 3,231,193
Patented Jan. 25, 1966

3,231,193
AUTOMATIC GAS FLOW CONTROL DEVICE
Charles D. Coffey, Inglewood, Calif., assignor to The Deutsch Company, Los Angeles, Calif., a corporation of California
Filed Apr. 20, 1964, Ser. No. 361,618
24 Claims. (Cl. 236—21)

This application is a continuation-in-part of my copending application Serial No. 265,979, filed March 18, 1963, now abandoned, for Automatic Gas Flow Control Device.

This invention relates to an automatic gas flow control device for control of water heaters and other gas-fired appliances. It serves as a safety device for cutting off a supply of energy when the normal control fails to perform its intended function. The invention is a universal automatic control unit which is a unitary device embodying therein a manually operated gas valve or gas cock which can be turned to an "OFF" position; an automatic temperature controlled valve, an automatic safety valve responsive to the presence of a pilot flame, and additionally condition responsive limit control means operable to close the safety valve. The device is a unitary one embodying in it all of the controls for the heater or device being controlled. All the elements are in a single compact assembly or unit rather than there being separate components connected by wiring. While particularly adapted for gas-fired water heaters, the arrangement of this invention has general applicability as an energy control device.

The invention provides and features an improved dual condition responsive device responsive to temperature, or temperature and pressure for providing for maintaining a given temperature and also limit control action. Preferably, this device uses a solid fill for temperature actuation. The dual elements are combined as a unit which can be installed or mounted as such with the elements in position for performing the dual functions. In operation, the device of this invention serves to cut off the supply of energy to the heating unit in the event that the thermostat fails to maintain the proper temperature range.

These results are accomplished through a unit that incorporates a rod and tube thermostat utilized in actuating the control valve of the gas supply for the water heater burner. The unit includes also a rapidly expansible element having a greater coefficient of thermal expansion than either the rod or the tube, movable at its outer end with the tube and subjected to the same temperature as that of the thermostat. At its inner end the expansion element is connected to a normally inoperative energy cutoff device actuated upon movement of this element to a predetermined point as a result of thermal expansion. In the usual operation of the water heater or other device, the thermostat controls the valve to maintain the water temperature within a prescribed range. The rapidly expansible member, under such conditions, will not elongate sufficiently to actuate the energy cutoff arrangement. However, in the event of malfunction of the thermostat or its valve, which would allow the burner to remain on and raise the water temperature beyond safe limits, the expansion element ultimately will lengthen sufficiently to operate the energy cutoff device and shut down the source of gas to the burner. This precludes overheating of the tank of water so that there is no danger from explosion or sudden release of steam or hot water.

The invention, therefore, is based upon the combination of a thermostat element that expands at one rate as the ambient temperature rises, and a safety element that expands more rapidly. The outer end of the safety element is carried in one direction as the thermostat expands from a temperature rise. The other end of the safety expansion element has a net movement in the opposite direction, despite the fact that its outer end travels with the thermostat. This arises from the greater coefficient of expansion that the safety element possesses. At the critical point the element will have expanded sufficiently to shift its inner end to where it actuates the control to cut off the supply of energy before injury or damage can occur.

A great advantage lies in providing a unitary device immersible in the water with the thermostat so as to be sensitive to the same temperatures that the thermostat is subjected to. The safety control is permanently set upon manufacture and is not subject to adjustment or miscalibration when in service. Once it is associated with the thermostat control there is no practical way of nullifying its operation, so that when it is installed it can be assured that it is in operation and that danger from overheating is precluded.

In the assembly of the invention an interlock or interconnection is provided between the limit control element and the safety valve. The safety valve is of a type that can be reset manually by a separate manual stem or button as will be explained hereinafter. The safety valve closes in response to either pilot flame failure or occurrence of the limiting condition.

The arrangement as described aforesaid makes possible a compact simplified and unitary mechanism. The dual condition responsive device contributes particularly to this end. Preferably, the elements are concentrically arranged and mounted or installed together to respond for example to boiler water temperature and/or pressure.

The object of this invention is the achievement and realization of the results and advantages as outlined generally in the foregoing.

A more specific object of the invention is to provide a universal gas flow control device of the type referred to in the form of an assembly having the particular arrangement briefly set forth in the foregoing, and having the capabilities stated combined in a single, integral unit.

A further object of the invention is to provide a safety override device usable in conjunction with a thermostat control and unitary with it to provide an energy cutoff in the event of malfunction of the thermostat.

An additional object of the invention is to provide an effective safety control to prevent excessive temperature rise in water heaters and the like.

Another object is to provide an assembly as in the foregoing object wherein the closing of the safety valve in response to a limiting condition is achieved through a mechanical interconnection, or interlocking mechanism between the dual condition responsive device and contact elements which bring about closure of the safety valve.

Another object of the invention is to provide a dual condition responsive device particularly adapted for utilization in an integral control assembly of the type referred to, the dual condition responsive device comprising concentric elements whereby only a single mounting is necessary to provide separate temperature and/or pressure responses by the device.

Another object is to provide a dual condition responsive device as in the foregoing, comprising a rod and tube thermostat having included therein an additional temperature responsive means or element and an actuated member separately actuatable thereby.

Another object is to provide a dual candition responsive device as in the foregoing, wherein the additional thermostatic means or element comprises a solid fill between the tube and rod of the rod and tube thermostat.

Another object is to provide a dual condition responsive device as in the foregoing, wherein additional temperature responsive means and also pressure responsive means are provided concentrically mounted externally of the rod and tube thermostat.

Another object is to provide a control assembly as in the foregoing including a dual condition responsive device having a mechanically actuated contact member actuated by one of the elements of the duel condition responsive device for effectuating closing of the safety valve.

Further objects and numerous additional advantages of the invention will become apparent from the following detailed description and annexed drawings wherein.

Figure 14:
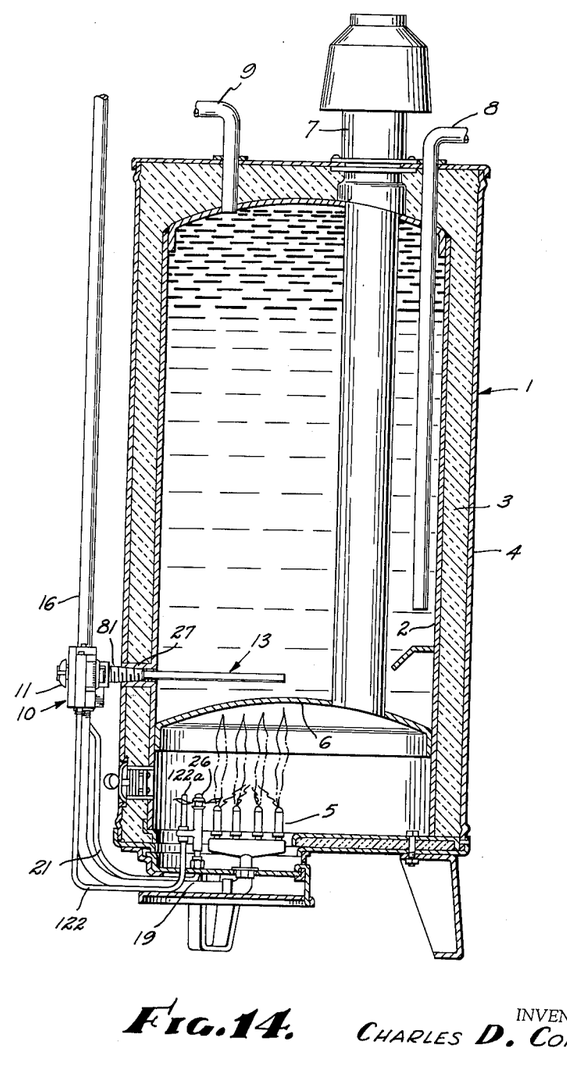
FIGURE 14 is a longitudinal sectional view of a water heater assembly utilizing the device of this invention.

With reference to the drawing, the arrangement of this invention is shown in FIGURE 14 as associated with a conventional gas-fired hot water heater 1. Such a heater will include an inner tank unit 2 to retain the water, exteriorly of which is a layer of insulation 3 and a thin outer shell 4. A gas burner 5 is located beneath the bottom wall 6 of the tank, being vented by flue 7. The combustion at the burner 5, therefore, serves to heat the contents of the tank. Water is supplied to the tank from inlet line 8, the end of which carries an extension projecting downwardly into the tank as a dip tube to discharge in the vicinity of the bottom wall 6. Hot water is removed from the top portion of the tank through the outlet line 9.

The unit 10 that incorporates the energy cutoff arrangement of this invention embodies in it a manually operable gas cock or plug cock which is operable by the manually rotatable handle or button 11. There is also an automatic thermostatic valve which will be explained more in detail presently which is operable by a thermostat 13. The assembly includes a safety valve which shuts off automatically in the event of failure of flame at the pilot burner or on the occurrence of a limiting control condition. The safety valve 15 is assembled in the same housing as is illustrated in particular in FIGURE 4, which is a sectional view taken along the line 4—4 of FIGURE 2.

Figures 1, 2, 7, 8:
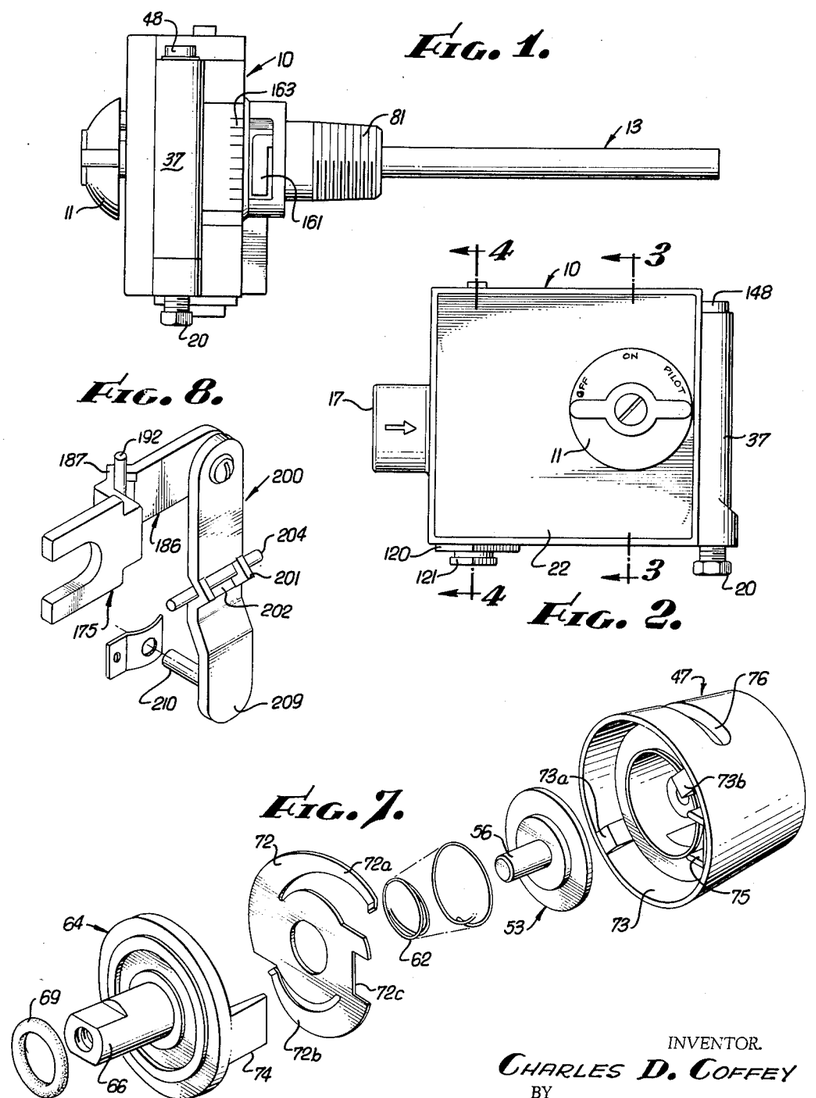
FIGURE 1 is a side external elevational view of a preferred form of the invention.
FIGURE 2 is an elevational view of the device of FIGURE 1.
FIGURE 7 is an exploded view of the plug cock and the rotatable actuator and biasing spring which are assembled with it.
FIGURE 8 is a detail perspective view of the linkage operated by the rapidly expansible safety element and forming a part of the assembly.

Gas is supplied to the unit 10 by inlet line 16 connecting to a boss 17 on the side of the housing (the latter element being illustrated in FIGURE 2). The outlet 18, shown in particular in FIGURE 3, connects to the line 19 that supplies the burner 5. A fitting 20 in the bottom portion of the housing 10 provides the connection for the line 21 to the pilot burner 26.

The unit 10 is installed in the lower portion of the tank 1 adjacent the bottom wall 6 in the location normally occupied by the heater control. It is mounted in place by threading its boss 81 through a coupling 27 provided in the side of the tank through the inner receptacle 2, the outer shell 4 and the intermediate layer of insulation 3. This extends the full length of the thermostat unit 13 radially into the tank, where it is subjected to the temperature of the water within the tank.

All water heaters manufactured presently must conform to certain regulations, one of which limits the temperature gradient from the bottom of the tank to the top. Under no circumstances will the difference between the top and bottom temperatures exceed a predetermined amount. In other words, the hot water that becomes concentrated near the top of the tank will never be greater in temperature than the water at the bottom by more than a limited number of degrees. For a 160° F. setting, for example, the tank must be designed so that the temperature at the top will never be greater than 190° F. A 180° F. thermostat has only a 20° F. allowable temperature differential. The arrangement of this invention takes advantage of this required construction in providing all the controls at the bottom portion of the tank. The safety control can be designed to cut off the supply of energy used in heating the tank upon the occurrence of a predetermined temperature at the lower part of the tank, because it will be known that the hottest portion of the tank can be only a finite number of degrees above it. Hence, it is entirely feasible to provide a unitary device, as in the present instance, to act as the safety limiting device for the water heater as well as its normal control.

Before proceeding to a detailed description of the parts of the assembly, it should be understood that normally the flow of gas through the thermostatic valve is controlled in response to the thermostat 13 to maintain a set temperature. The valve can be manually turned to an "OFF" position at any time by the manual button 11. If, at any time, the pilot flame at the pilot burner should go out, the safety valve 15, FIGURE 4, will close automatically to shut off the flow, this valve being electromagnetically controlled as will be described. In the event the safety valve shuts off, it can be manually reset and means are provided to prevent flow of gas to the main burner but not to the pilot burner during the resetting, the purpose being to preclude the possibilities of slugs of gas being allowed to go to the main burner when the pilot is out. Such gases could accumulate in the combustion chamber and then when the pilot burner is lighted an explosion might occur.

The thermostat 13 in the preferred exemplary form is a dual type, having rod and tube elements controlling the thermostatic valve. A solid fill thermally responsive element is associated with the rod and tube to act as a limit control, and operative to close the safety valve. This unit may respond to any ambient temperatures whether liquid, gas or solid.

To now proceed to the details of the assembly, the housing 10 in the form of the invention shown is generally rectangular. It has a top cap member 22 which may be attached by screws. This member has openings or cavities 23, 24 and 25, and the parts of the cap surrounding these openings bear against the body of the valve assembly with a sealing gasket 28 therebetween. See FIGURE 3. There is also a detachable side plate or member 30 which is attached to a side part of the valve body adjacent one edge part of the cap member 22 as may be seen in FIGURE 3. An opening or cavity 33 in a side part of the valve body is closed by the cap or cover 30 with a sealing gasket 34 in between. This space has a port, not shown, which communicates through another port with an adjustable needle valve in the housing part 37 by which the flow to the pilot burner can be adjusted as will be described in detail presently. The space 33 communicates with the gas supply through the plug valve or gas cock as will be described. A body of filtering material may be provided in the space 33 to filter the gas that is supplied to the pilot burner.

Figure 3:
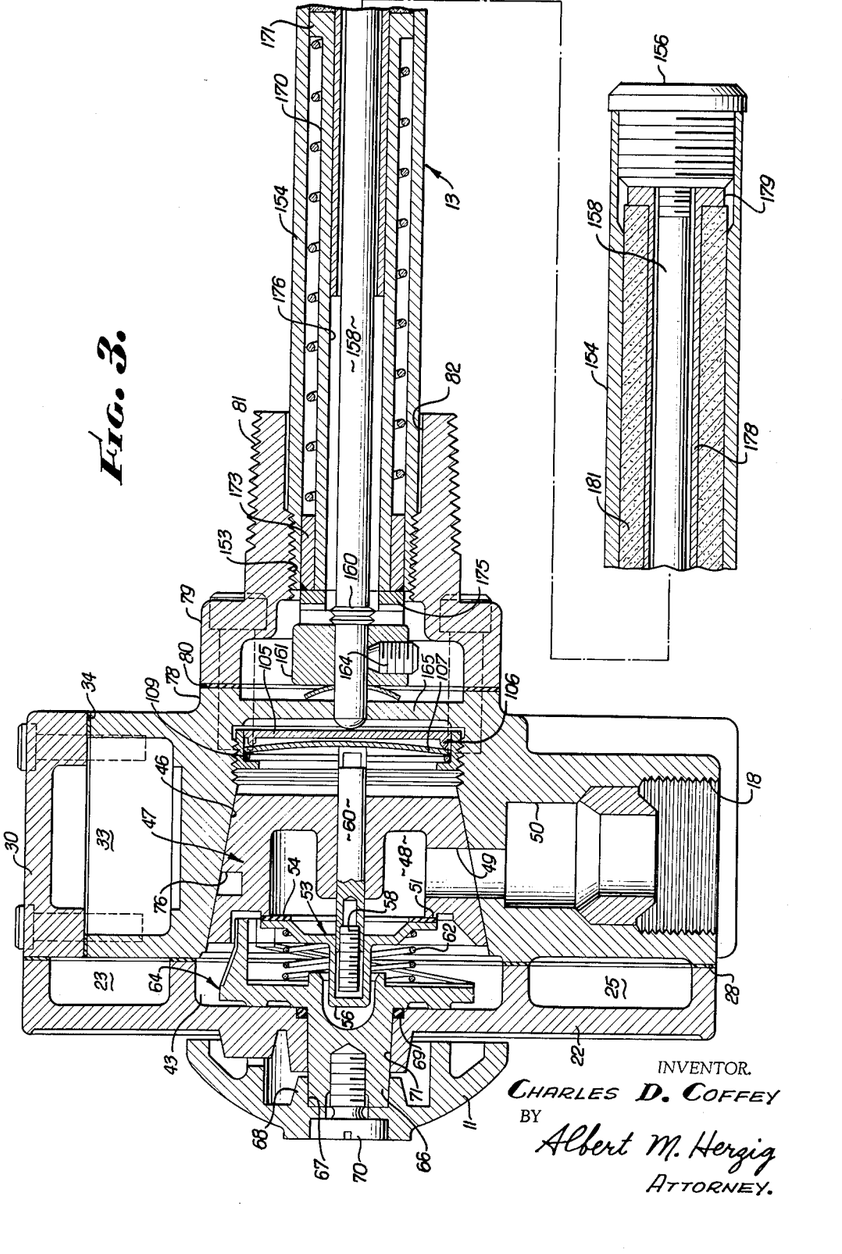
FIGURE 3 is an enlarged cross sectional view taken along line 3—3 of FIGURE 2.
Figure 4:
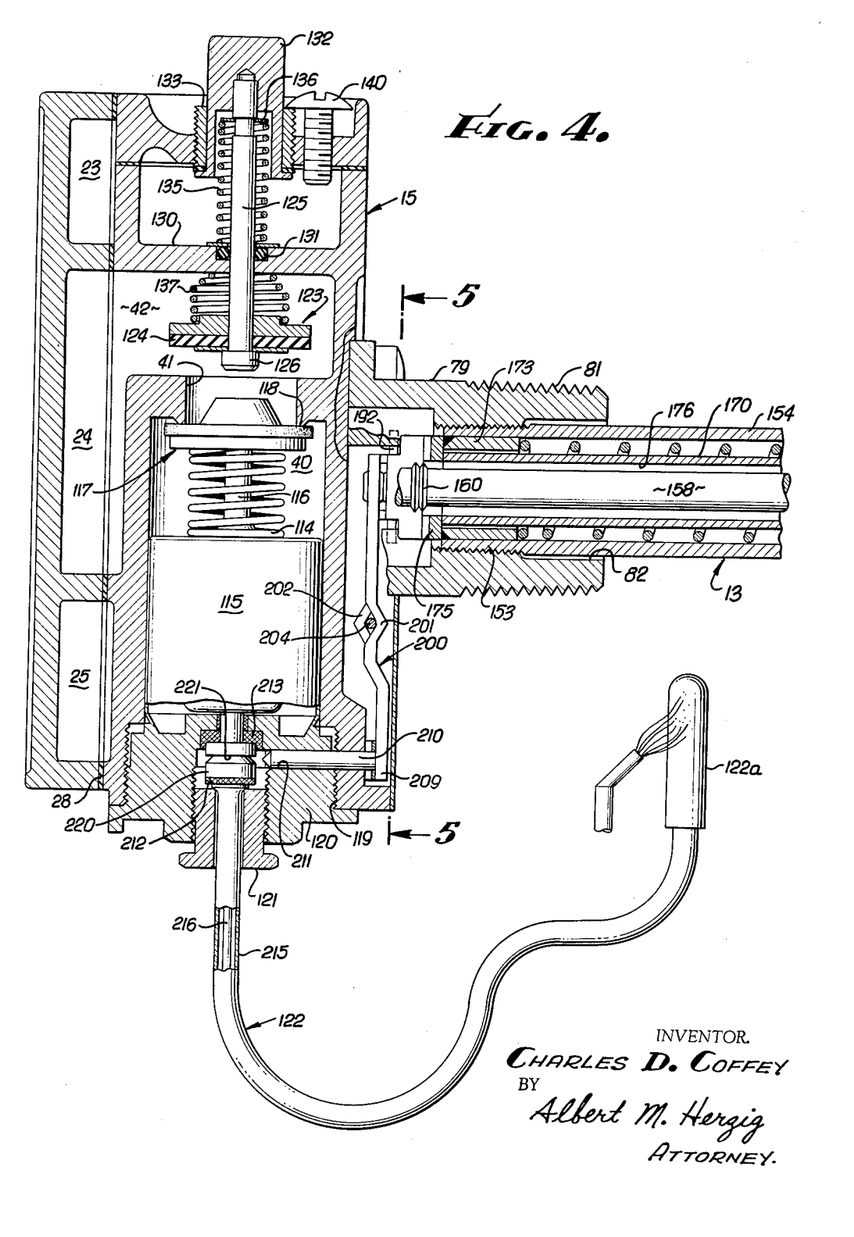
FIGURE 4 is an enlarged cross sectional view taken along line 4—4 of FIGURE 2.

The inlet 17 shown in FIGURE 2 communicates directly with the space 40 in the safety valve body or component as shown in FIGURE 4. The safety valve port 41 communicates with space 42 which is open to, that is, is in direct communication with, the space 43 over the thermostatic valve in FIGURE 3. The safety valve will be described more in detail presently.

Within the body of the valve assembly, as seen in FIGURE 3, there is a tapering bore 46 in which fits a tapering plug cock or gas cock 47. The plug cock is internally formed to have an annular space 48 communicating with a passage or channel 49 and bore or opening 50 leading to the threaded outlet port or connection 18.

Adjacent the outer end of the annular opening 48 there is formed in the plug cock 47 an annular valve seat 51, and cooperating with this seat is the thermostatic valve 53. The valve member 53 carries a resilient annular sealing member 54. The valve member 53 is disc-shaped and has a central extending tubular stem 56 and received within this tubular part is a screw or threaded member 58. The latter member is received in the end of a stem 60 which extends through the plug cock 47, and which is actuatable by the thermostatic device as will be described presently. The valve member 53 is normally urged against the seat 51 by a coil spring 62, the other end of which bears against a rotatable actuator 64 which is manually rotatable by the knob 11 to rotate the plug cock 47. The rotatable actuator 64 is disc-shaped and has an extending stem 66 on which the button 11 is mounted. The button 11 has a bore 67 within extending skirt 68 and the stem 66 is received in this bore and is held in by a screw 70, the head of which is received in a counterbore in the knob 11. The rotatable actuator stem 66 is in a bore 71 in the cap member 22 and is sealed by a sealing O-ring 69 in an annular groove at the end of the bore 71.

The plug cock 47 and thermostatic valve element are shown in perspective in FIGURE 7 along with the rotatable actuator 64 and the disc or leaf spring member 72. The plug cock 47 has a peripheral extending skirt 73 outside and beyond the valve seat 51. The spring member 72 has arcuate extending leaves or legs 72(a) and 72(b) which are resilient and extend out of the plane of the disc. These legs bear against the flat ended abutments 73(a) and 73(b) extending inwardly from the skirt 73 so that the spring 72 normally urges the plug cock 47 into the tapered bore 46.

The rotatable actuator 64 has a downwardly extending prong or finger 74 which fits through an opening 72(c) in spring 72 and engages in an arcuate slot 75 formed internally within the skirt 73 as shown in FIGURE 7. Thus, when the knob 11 is turned, the rotatable actuator 64 rotates with it and this member in turn rotates the plug 47.

To briefly review the flow of the main gas through the valve, it comes in at the inlet 17, FIGURE 2, and enters the space 40 as designated in FIGURE 4. It passes through the safety valve port 41 into the space 42 which communicates with the space 43, FIGURE 3. It then goes through the thermostatic valve into the annular space 48 in the plug cock 47 and then through the channels 49 and 50 to the outlet 18. The flow of gas to the pilot burner will be traced in detail presently.

The manual knob 11 is rotatable to "OFF," "ON," and "PILOT" positions as shown in FIGURE 2. In the "ON" position, the space 48 communicates with the channel 49 and in the "OFF" position, it is cut off from the chanel 49 to close the valve. The effect of its being in the "PILOT" position will be described presently.

Referring to FIGURE 4, there is a lateral port in seat 41 of the safety valve, not shown, which communicates with an arcuate groove of limited angular extent 76 in the side of the plug cock 47. Also, in the bottom of the cavity 33, FIGURE 3, there is a port, not shown, communicating with the tapered bore 46 and which communicates with the opening 76 in the plug cock 47. The positions of the two ports which are not shown are such that they are not visible on the sectional views 3 and 4 but it should be understood that these ports are normally bridged or in communication through the arcuate channel 76 when the plug cock is in "PILOT" or "ON" position (FIGURE 2) allowing communication of the gas to the pilot burner. However, in the "OFF" position, flow is cut off to both the main burner and the pilot burner.

The valve body has an extending boss 78 to which is attached, such as by screws, a cap 79 with a sealing gasket 80 interposed therebetween. The member 79 has an extending threaded boss or plug 81 having a bore 82. The boss 81 is used in connecting the unit to the water heater wall as noted above.

The end of the bore 46 in the valve body is cylindrical and threaded as shown. In the end of this bore is a disc or plunger member 105 having a peripheral extending lip 106 which bears against the peripheral edges of a snap disc 107. The disc 105 fits within a bushing 108 threaded into the end of the bore 46. The bushing 108 has an inturned flange and a snap ring member 109 is interposed between the flange and the peripheral parts of the snap disc 107. The center part of the snap disc 107 is operable to act against the end of the stem 60 to open the valve 53 so as to open the passageway through the plug valve or plug cock 47. This operation is with a snap action having a predetermined differential as known in the art. The result is that the thermostat 13, depending upon its adjustment, will maintain a predetermined temperature of water in the heater by controlling the gas flow through the valve to maintain this temperature.

Reference will be had now particularly to the safety valve component of the assembly shown more in detail in FIGURE 4. The safety valve embodies an electromagnet 115 having an armature cooperating with a stem 116 attached to the safety valve 117. The safety valve cooperates with a seat 118 at one end of the port 41. The electormagnet assembly includes a threaded fitting 120 which threads into a threaded bore 119 in a side part of the valve body. A threaded fitting 121 is carried by the member 120 and is adapted to receive the thermocouple leads 122 which lead from the electromagnet 115 to a thermocouple 122a disposed in the flame of the pilot burner 26. The control of the electromagnet by the limit control mechanism will be described presently.

Cooperating with the opposite end of the port 41 is another valve member 123 having a resilient seating and sealing member 124. This valve member is slidable upon a stem 125 which is a reset stem having a button 126 on its end which may pass through the port 41 and engage the valve member 117 for resetting the said valve member. The stem extends through a web 130 within the body of the valve and is sealed therein by a sealing ring 131 in an annular groove adjacent to the stem. On the end of the stem 125 is a manual reset button 132 which slides in a sleeve or fitting 133 threaded into a threaded bore in a side port of the valve body. A coil spring 135 encircles the stem 125, one end of the spring bearing against the web 130 and the other end of the spring bearing against a spring retainer disc 136, so that this spring normally urges the stem 125 in a direction to move the valve 123 away from its seat at the end of port 41. The valve 123 is normally urged downwardly in the opposite direction as seen in FIGURE 4 by a weaker coil spring 137 interposed between an annular shoulder on this valve and the web 130. The threaded sleeve 133 is held in position by the edge of the head of a screw 140 adjustably threaded into the cap member 30 is shown. The screw 140 may be loosened to adjust the threaded sleeve 133 and to thereby adjust the stroke of the manual reset stem.

With reference to the operation of the safety valve component, when there is flame at the pilot burner, the electromagnet 115 is energized by the thermocouple and it is operable to hold the valve 117 off its seat against the force of its biasing spring 114. In the event of pilot failure, the electromagnet is de-energized and the spring 114 seats the safety valve 117 on its seat 118 as illustrated in FIGURE 4. This valve cannot be reopened except manually. The electromagnet 115 is strong enough to hold the valve 117 in open position after it has been manually opened but it is not strong enough to initially open the safety valve. If the safety valve has operated to closed position, it may be manually opened, that is, reset, by the button 132. When this button is pushed in, the knob 126 on the end of stem 125 engages valve 117 and resets it, that is, opens it, moving it to the position it is held in when the electromagnet 115 is energized. If the pilot flame is burning, the safety valve will be held open when the button 132 is released. Whenever the stem 125 is actuated as described, the valve 123 will seat against the end of port 41 under the influence of spring 137. Thus, flow through the port 41 is cut off during resetting to insure that no gas at all is allowed to go to the main burner until it is, in fact, established that there is flame at the pilot burner. When the button 132 is released, the spring 135 returns the reset mechanism to the position shown in FIGURE 4.

During resetting, valve 123 cuts off flow through port 41 so that, as described, there is no flow of gas to the main burner. However, the lateral port not shown which has been previously described which extends from the port 41 between the two valve members, allows flow of gas to the pilot burner during resetting. This port communicates with the arcuate groove 76 in the plug 47. This groove bridges the port just referred to and the other port previously described, but not shown, which provides communication between arcuate opening 76 and the cavity 33 shown in FIGURE 3. This cavity communicates with the needle valve in port 37 as described. This needle valve is in a side part of the valve body as indicated in FIGURE 2. The needle valve has an axial bore including a threaded counterbore having an adjusting screw for adjusting the rate of bleed of gas to the pilot burner. The threaded bore is closed by a screw cap or button 148 which threads into the side bore to provide access to the adjusting member screw. The gas connection to the pilot burner is made to the threaded nipple 20 at the opposite end.

Figure 5:
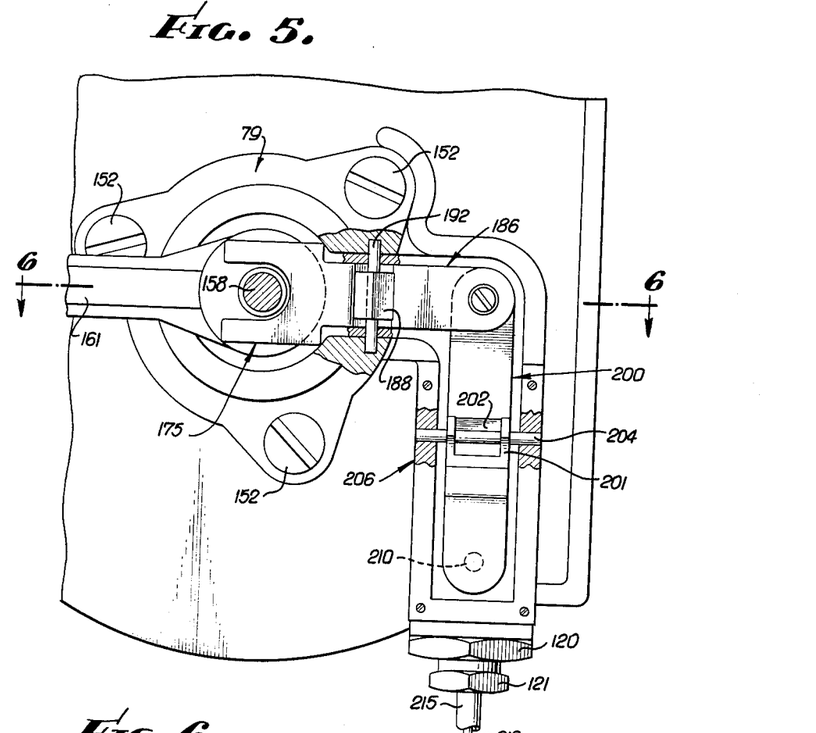
FIGURE 5 is a cross sectional view taken along the line 5—5 of FIGURE 4.

Next will be described the dual thermostatic device 13 which, in the assembly, controls the thermostatic valve to maintain a predetermined set temperature, and also controls the safety valve to shut it off in response to a limiting condition. The device 13 may respond to pressure conditions as well as temperature, as will be described hereinafter. The cap member 79 and boss 81 are attached to the body of the valve by screws 152 as shown in FIGURE 5. The device 13 comprises a rod and tube type thermostat, including a tube 154 of suitable material which is threaded into a threaded bore 153 in the boss 81, as shown in FIGURE 3. The end of this tube is closed by a threaded cap 156. Carried by the cap 156 is the rod 158 of a material having a different coefficient of expansion than the tube 154. A typical thermostat of this type includes a rod of invar, having a very low coefficient of thermal expansion, circumscribed by a copper tube that has a considerably greater coefficient of expansion. The rod 158 has threads 160 adjacent an inner end thereof, and these threads are adjacent an adjusting handle 161 which extends outwardly through an opening in the cap member 79, and moves adjacent a graduated scale 163 on the housing, as shown in FIGURE 1. The adjusting lever 161 is attached by a set screw 164. The end of the rod 158 extends through an opening in a web 165 within the valve body and it bears against the plunger 105. Rotation of the lever 161 turns the rod 158 relative to the tube 154, hence controlling the axial position of the rod and the temperature at which it will operate the thermostatic valve 53. Therefore, the rod and tube thermostat is operative to control the thermostatic valve to maintain a predetermined temperature as determined by the setting of the handle 161. The thermostat operates the snap disc 107 in the manner previously described.

The dual condition responsive device 13 combines dual thermostatic action and/or action in response to another condition such as pressure. Within the tube 154 is a tubular piston 170 of smaller diameter having an end part 171 that slides within the tube 154. The other end moves within a bushing 173 in the end of tube 154. The end of piston 170 acts against the legs of a yoke designated by the numeral 175 as shown more clearly in FIGURES 5 and 8. The legs of the yoke straddle the rod 158 as may be observed. The piston 170 has a bore 176 and within this bore is a tubular member 178 having a head part 179 adjacent the end of the threaded cap 156. The tubular member 178 forms a container between itself and the tube 154 for a solid fill 181 of temperature responsive material, and this may be silicone rubber or the like, or comparable material which has a relatively high coefficient of thermal expansion, exceeding that of the tube 154. In other words, the element 181 expands or responds in response to temperature changes at a different and considerably greater rate than the rate of motion realized from the rod and tube thermostat, for reasons which will be made clear presently. The solid fill 181 is in effect a second thermostat that acts against the piston 170 and is able to actuate the yoke 175.

Figure 6:
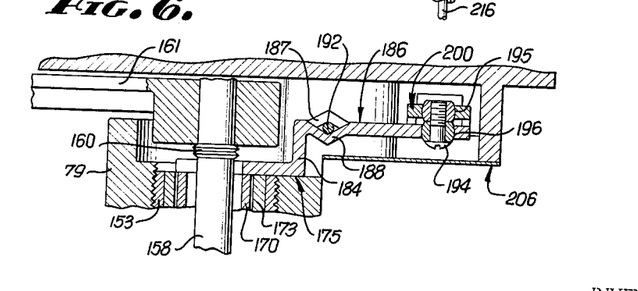
FIGURE 6 is a sectional view taken along line 6—6 of FIGURE 5.

Referring to FIGURES 5, 6 and 8, the yoke 175 is formed on an offset part 184 on a lever 186 which lever has intermediate angular bent out portions 187 and 188 forming an opening, whereby this lever is pivotally mounted on a pivot pin 192 which is mounted in portions of the housing formed by the cap member 79. One end of the lever 186 and the members 195 and 196, having rounded side parts are attached by a screw 194 to another lever 200. The lever 200 has intermediate extending angular formations 201 and 202 as shown in FIGURE 8, forming notches or grooves whereby this lever is pivotally mounted on a shaft 204 which may be seen in FIGURE 5. The two levers pivot about axes which are normal to each other, the relative rotative movements being permitted by the members 195 and 196 which are arcuate and fit into similarly arcuate sockets in the levers 186 and 200 in the manner of ball and socket joints. The shaft 204 is mounted in the sides of a housing 206 having the shape as shown in FIGURE 5 and which is formed as an extension from the cap or end member 79. The lever 200 has an offset end portion 209 from which extends a pin 210. This pin extends through a bore in a sidewall of the housing 10 adjacent the bushing 120, and it extends into a bore 211 in this bushing to a position opposite the end of the threaded plug or nipple 121 previously described.

The thermocouple leads are in the form of an outer tube 215 and a coaxial inner member or lead 216. The inner member 216 connects to one end of the electromagnetic winding, and normally the electromagnetic circuit is completed through the bushing 120 and the plug member 121 back to the tube 215. In the bore in bushing 120, inside of the fitting 121, is a contact spool 220 having a groove 221 adapted to be engaged by the pointed end of the stem or pin 210 when it is moved inwardly by the lever 209. This action occurs when the solid fill 181 responds to a rising temperature, that is, a limiting temperature in the boiler water such as to actuate the lever 186 and consequently the lever 200. Spool 220 is insulated from tube 215 by insulator 212 and from bushing or plug 120 by insulator 213. When stem 210 engages spool 220 a shunt circuit is formed providing a path of lesser resistance from one side of the electromagnetic winding back to the tube 215. The electromagnet then receives insufficient power to hold the safety valve 117 open, and it closes under the influence of its biasing spring.

It should be observed that the thermostat is dual in that it acts to control the thermostatic valve to maintain the temperature, and will also act to close the safety valve in the event of a higher limiting temperature. The thermostatic elements are arranged concentrically in a single unit or assembly which may be inserted into the boiler water.

As an alternative to the two pivoted levers, 186 and 200, a single lever may be used in an angular position between the stem or rod 158 and the contact pin 210. Such an alternative arrangement requires only one pivoted lever and the housing 206 in such circumstances is similarly shaped and positioned to house such lever.

It should be understood that in the normal action of the device 13, the rod and tube thermostat act to operate the thermostatic valve. When the water in the tank 1, or other ambient condition to which the unit 13 is subjected, is within the usual temperature range, the element 181 will not expand sufficiently to rotate the levers associated with the yoke 175. However, in the event of a malfunction causing the temperature to rise unduly, the other part of the dual device takes over, i.e., the solid fill then acts upon the lever mechanism to produce the shunt circuit described, and to cause the safety valve to close. Upon interruption of the shunt circuit, the safety valve could then, of course, be reset and held open in response to the thermocouple. The solid fill 181 has a coefficient of thermal expansion such that it will produce more rapid motion than the rod and tube thermostat so that, in the event of rising temperature to a limiting temperature, the solid fill can act in the manner described to close the safety valve.

The overall operation of the arrangement of this invention is such that, as the temperature in the tank 1 increases, the tube 154 expands, becoming elongated in proportion to the temperature rise. With the inner end of the tube 154 being anchored to the boss 81, the expansion will cause the outer end of the tube to move away from the tank wall. The rod 158, having a very small coefficient of thermal expansion, elongates only slightly so that the tube 154 carries the rod outwardly with it. Therefore, the inner end of the rod 158 moves outwardly with respect to the unit 10 to allow the spring 62 to close the thermostatic valve 53 at the upper limit of the preselected temperature range. During this time, the expansion element 181 also expands and, therefore, increases in length, being subjected to the same rising temperature as the tube 154 and the rod 158. At its outer end the element 181 can move at no greater rate than the rate of expansion of the tube 154 because it is confined by the flange 179 that abuts the end cap 156. Hence, the linear expansion of the element 181 results in inward movement of the inner end of this element, which in turn reacts against the flange 171 of the piston 170 to shift the piston in the same direction. There is a net inward movement of the inner end of the piston 170 because the element 181 expands more rapidly during a given temperature rise than does the tube 174. The element 181 has a greater coefficient of expansion than the tube 154, and the dimensions of these members are correlated to result in this inward shifting of the inner end of the member 181 as the ambient temperature increases. Thus, while the outer end of the element 181 moves outwardly with the tube 154, the inner end of the element 181, and hence the piston 170, is moved inwardly toward the unit 10. In normal operation, this inward movement of the piston is insufficient to cause the yoke 175 to rotate its associated levers an amount necessary to shunt the thermocouple circuit.

However, in the event of malfunction of the thermostat or the thermostatic valve so that the burner remains on, causing the water in tank 1 to rise beyond the established range and to reach a predetermined higher temperature, the element 181 drives the piston 170 through a stroke sufficient to cause the yoke 175 to actuate the shunting mechanism. In other words, at a known critical point, the greater expansion of the element 181 causes the inner end of this element to move to a position where the energy cutoff arrangement is placed into the operation, so that the energy supply is shut down and no further temperature rise will occur in the tank 1. Therefore, in all instances where the thermostat fails, dangerous overheating of the tank will not take place because the means for heating the tank will be removed as the source of energy is closed off. In view of the fact that the temperature rise between the bottom and the top of the tank is a known value, the override device can be set to cut off the gas supply at a temperature which will keep all portions of the tank well below the boiling point.

Figures 9, 10, 11, 12, 13:
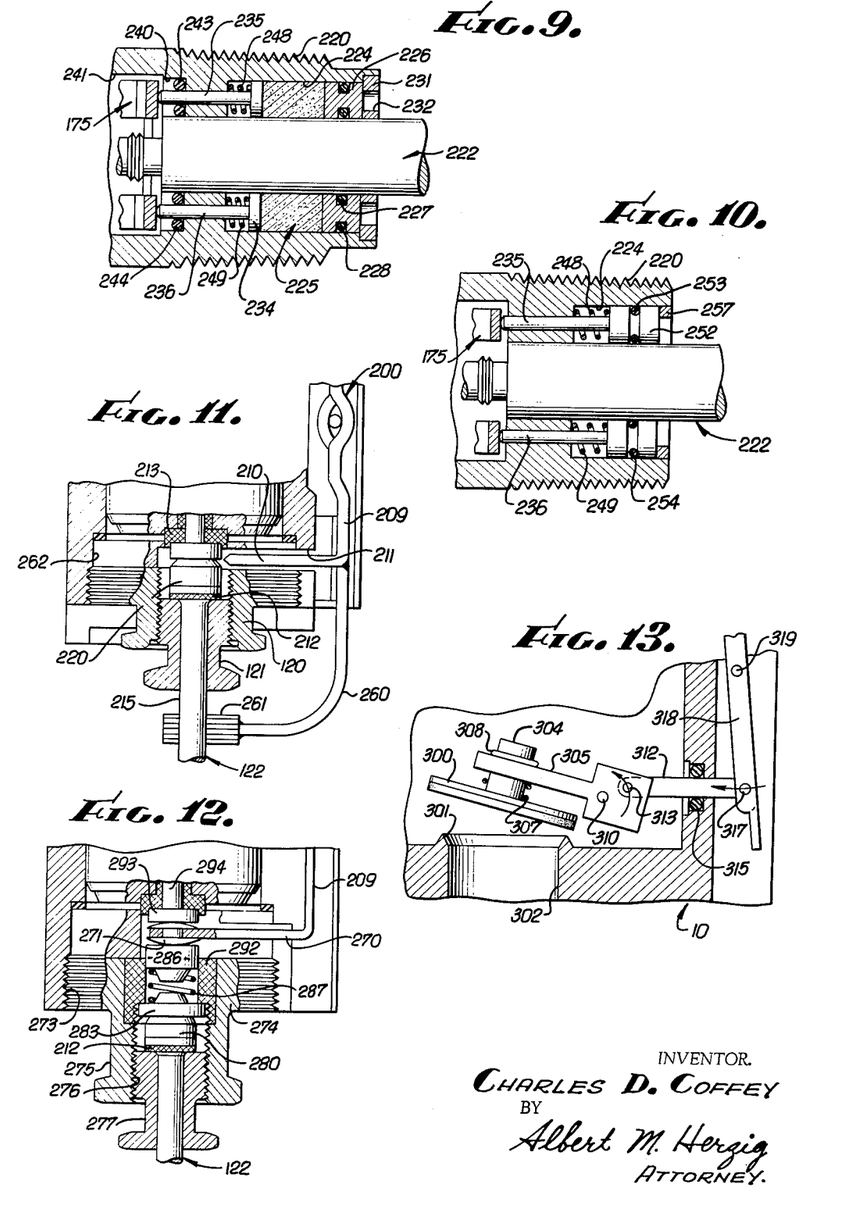
FIGURE 9 is a sectional view of a modified form of dual condition responsive device responsive to both pressure and temperature.
FIGURE 10 is a sectional view of another modified form of control device in which the energy cutoff is actuated solely by a pressure condition.
FIGURE 11 is a sectional view of a modification generally similar to the embodiment of FIGURES 1 through 8, but with a different shunt connection.
FIGURE 12 is a sectional view of a modification where contacts are broken at the limiting condition to open the circuit of the thermocouple.
FIGURE 13 is a sectional view of a modification in which a valve is closed by the movement of the expansion element.

The condition responsive mechanism 13 is readily susceptible to variations in arrangement, and because of its particular construction it is extremely versatile in its adaptations. It may be constructed so as to be responsive to pressure as well as having the dual temperature function described above. Such a variation is shown in FIGURE 9. In this figure, the threaded boss 220 corresponds to the boss 81 of FIGURE 3. A conventional rod and tube thermostat 222 is provided for operating the thermostatic valve. The yoke 175 is like that of the previous embodiment. The boss 220 has a bore 224 containing a solid fill 225 like that of the previous embodiment, which is around the tube of the thermostat 222. In the bore 224 is a piston 226 which is sealed by the O-rings 227 and 228 to the tube of the thermostat and to the inside of the bore 224. In the end of the boss or fitting 220 is a closure disc 231 having openings 232 in it, admitting boiler water pressure or the like to the piston 226.

In the bore 224 is another piston member 234 having stems 235 and 236 extending through longitudinal bores in the body of fitting 220 and into another bore 240 in the fitting 220 at the bottom of a counterbore 241. The stems 235 and 236 are sealed by O-rings 243 and 244 and they act against the legs of the yoke 175 for actuating the lever 186 as in the previous embodiment.

In the embodiment of FIGURE 9, the rod and tube thermostat 222 controls the thermostatic valve in the manner previously described. The solid fill 225 is responsive to boiler water temperature to act as a limiting control to close the safety valve in the event of an excessive temperature. Additionally, excessive pressure such as boiler water pressure may act on the piston 226 and through the solid fill 225 to move the piston 234 so as to operate the yoke 175 and the lever 186 in the same manner to close the safety valve. The piston 234 acts against the springs 248 and 249 around the stems 235 and 236.

FIGURE 10 shows a variation of the invention in which the limiting control or function is in response to pressure only. This structure is like that of FIGURE 9 except that a rapidly expansible temperature-sensitive member is not used. In this figure, the piston 252 has sealing O-rings 253 and 254. In the end of the bore 224 is a closure ring 257. Pressure enters through the ring 257 and acts on the piston 252 for closing the safety valve in the manner described in connection with FIGURE 9.

The embodiment of FIGURE 11 is like that of FIGURE 4 except that the lever 200 has an additional extending end part 260 which connects to a laminated iron unit 261, around the tube 215 of the thermocouple lead assembly. In this form of the invention, the pin 210 is spaced from the end of bushing 120 and side bore 211, and is within bore 262 at the end of the bushing or plug 120. When the pin 210 contacts the spool 220, a shunt circuit is produced through the pin 210 from the spool 220 which is connected to the inner lead 216 and through the extending part 260 and the iron member 261 back to the outer lead 215. This provides a path of lesser resistance which reduces the current in the electromagnet so that it cannot hold the safety valve open and it closes.

FIGURE 12 shows a modified form of the invention wherein the end part 209 of the lever 200 has a transverse portion 270 which carries a contact button 271. The threaded bore 273 receives the bushing 274 which has an extending neck 275. It has a threaded bore 276 receiving the threaded nipple or fitting 277 through which extends the thermocouple lead assembly 122. Connected to the end of the inner lead within the bore 276 is a contact member or spool 280 spaced from the fitting 277 by an insulator 212. The fitting 280 has a circular member 283 having an extending projection. This member is spaced from a contact member 286 having an extending projection as shown, there being a coil spring 287 between these two members. They are positioned inside of an insulating bushing 292. The contact button 271 is between the member 286 and a circular member 293 on the end of a stem 294 connecting to the electromagnet winding. In the operation of this modification, when the lever 200 is rotated, its end part 270 moves downwardly so that the contact button 271 moves away from the member 293 pushing member 286 downwardly against the spring 287. This interrupts the circuit to the electromagnet which is de-energized allowing the safety valve to close. This arrangement has the desirable feature of basing the operation of the energy cutoff system upon the breaking of an electrical circuit instead of upon establishing contact as in the shunt type. There is no likelihood of failure of the safety override to operate from corrosion of the contacts or the presence of foreign matter, so that reliability of operation is assured.

Another variation is shown in FIGURE 13. In this variation of the invention, instead of closing the safety valve as described above in response to the limiting temperature, the limiting mechanism is utilized to close a separate valve which is preferably within the same housing assembly as the other components as described above. In this arrangement, a valve 300 cooperates with a port 301 and a valve channel 302 in the body of the assembly. Typically, the valve passage 302 will lead to the pilot burner 26 so that the pilot flame will become extinguished when the valve is closed. This, in turn, will cause current flow to cease in the thermocouple leads 215 and 216, and consequently the valve 117 will close to block the gas flow to the burner 5. Alternately, the valve passage 302 may control the flow directly to the main gas burner 5. The valve 300 has a stem 304 and this stem is connected to a pivoted actuating lever 305. Between the end of the lever and the valve is a spring 307 which is held at one end by a retainer 308. The lever 305 is pivoted about a pin 310. The lever is actuatable by an extending link 312 pivoted to the lever by pin 313. This link extends through an opening in a sidewall of the housing 10 including a counterbore having a sealing O-ring 315 in it. This link is pivotally connected by pin 317 to the end of the lever 318 which is pivoted about pin 319. The lever 318 is actuatable by the dual condition responsive device as described in the foregoing, utilizing any of the forms such as shown in FIGURES 3 and 4 or 9 and 10.

From the foregoing detailed description of the assembly and the description of the individual components thereof, those skilled in the art will understand the nature of the invention and the overall operation of it. The overall operation will, however, be briefly summarized.

In the "OFF" position of the manual knob 11 the flow to both the main burner and the pilot burner is cut off. The "ON" position is the normal operating position, during which time the thermostatic valve operates to control the flow of the water to maintain a predetermined set temperature of the water, for example, set by the adjustable member 161. In the "PILOT" position of the knob 11 the flow is cut off to the main burner by the plug cock, but flow continues to the pilot burner so that it remains on.

During normal operation, the valve 53 is opened and closed by the rod and tube of the dual condition responsive device 13 to maintain the temperature of the water. In the event of pilot flame failure, the safety valve shown in FIGURE 4 closes with valve 117 seating on seat 118. To reset the safety valve, the button 132 is pushed which resets the safety valve 117 to the energized position of the electromagnet 115, that is, if the pilot is on. During the resetting, flow is cut off to the main burner by the valve 123 which seats at the other end of port 41. As may be seen, the safety valve cuts off the flow to the main burner as well as the pilot burner. The manual reset valve 123, however, does not cut off flow to the pilot burner and this flow is occurring during the resetting operation, this, of course, being necessary to have flame at the pilot burner and to have the electromagnet energized. The purpose of the "PILOT" position of the knob 11 is to make it possible to manually shut off flow to the main burner but without discontinuing the pilot burner so that automatic operation can be re-initiated merely by resetting knob 11 to the "ON" position.

In the assembly, as shown, the additional thermostatic means embodied in the dual device 13 is responsive to the same temperature. The composite concentric assembly of these elements makes possible a single mounting which, in the exemplary form of the invention, is to respond to temperature in a boiler or tank. The entire unit is, in fact, integral, with all of the control functions unified and integrated therein without separate components, and without wiring interconnections therebetween. In the event of a malfunction such that the water temperature rises above the temperature which is set for the thermostatic valve to maintain, the additional temperature responsive means takes over. The solid fill 181 reacts against the piston 170 and actuates the yoke of the lever 186. The solid fill has a coefficient of expansion such that it expands at a greater rate than the movement occasioned by the difference in coefficients of expansion between the tube 154 and rod 158 of the rod and tube thermostat. The thermostat fill, therefore, takes over. The movement of lever 186 is transmitted to lever 200 and its actuates the pin 210 in the manner described to mechanically make electrical contact with the spool 220 for producing the shunt circuit which causes the electromagnet to release and close the safety valve. When the temperature again recedes, pin 210 is moved out of contact with spool 220. If the safety valve is now manually reset it can again be held open in response to the thermocouple 122a.

The forms of the invention shown in FIGURES 9 to 12 operate similarly to the foregoing. In the form shown in FIGURE 9 the limiting function may be in response to temperature and/or pressure, the pressure acting on the piston 226 in the manner described in the foregoing. In FIGURE 10, as described in the foregoing, the limiting function is in response to pressure only, the pressure acting on piston 252.

In FIGURE 11, due to the additional end part 260 of the lever 200 and the spacing between the pin 210 and the member 261 engaging the thermocouple lead 215, a shunt having substantially lesser resistance is produced so that the electromagnetic winding does not receive sufficient power to hold the safety valve open.

In the form of the invention of FIGURE 12, instead of producing a shunt circuit, the contact members 271 and 293 are opened to completely interrupt the electrical circuit to the electromagnetic winding, the operation otherwise being the same.

In FIGURE 13 the additional valve 300 is embodied in the same assembly and instead of closing the safety valve in response to the limiting conditions, this additional valve is closed, it being in series with the flow to the pilot valve or the main valve.

From the foregoing, it will be observed that the invention as described herein achieves and realizes all of the objects and advantages as enumerated in the foregoing, as well as having many additional advantages which are apparent from the detailed description. The invention provides a unitary integrated universal control device in which all of the control functions are incorporated in one compact unit requiring but a single mounting. The condition responsive elements are so constructed and arranged as to make possible the single mounting with the same conditions acting on all the elements. The arrangement provides for a simplified but compact and effective assembly.

The foregoing disclosure is representative of preferred forms of the invention and is to be interpreted in an illustrative rather than a limiting sense, the invention to, be accorded the full scope of the claims appended hereto.

I claim:
1. A condition responsive device comprising
a rod and tube thermostat,
additional thermostatic means concentrically arranged with respect to the rod and tube thermostat,
said additional thermostatic means comprising an element between the rod and tube of the rod and tube thermostat,
means actuatable by the rod and tube thermostat,
and means actuatable by said additional thermostatic means.

2. A dual condition responsive mechanism comprising
a rod and tube thermostat,
energy supply means actuated by the said thermostat,
an additional condition responsive element concentrically mounted with respect to the rod and tube thermostat,
energy cutoff means actuatable by the additional condition responsive element comprising a lever having a yoke,
and means providing engagement between the additional condition responsive element and the legs of the yoke.

3. In a gas flow control device of the type embodying a thermostatic valve, an electromagnetic safety valve responsive to a pilot flame, and a rod and tube type of thermostatic device for controlling the thermostatic valve,
an additional condition responsive means concentrically mounted with respect to the rod and tube thermostat,
and connections provided between said additional condition responsive means and the safety valve for closing it.

4. A control device as in the preceding claim wherein the additional condition responsive means comprises
a thermostatic element mounted between the rod and tube of the rod and tube thermostat,
actuating means comprising a lever having a yoke at the end thereof
straddling the rod of the rod and tube thermostat and positioned to be actuated by the said thermostatic element,
and means whereby said lever is able to effect the closing of the said safety valve.

5. A device as in the preceding claim including
a contact member operable by said actuating lever and movable into a position engageable with a lead extending from a thermocouple to the electromagnet
for producing a shunt circuit capable of causing the electromagnet to release and close the safety valve.

6. In a gas flow control valve of the type embodying a thermostatic valve, an electromagnetic safety valve, and a unit including a concentrically mounted rod and tube thermostatic device for actuating the thermostatic valve, the improvements comprising
an additional condition responsive element embodied in the unit
and having means responsive to a separate condition for closing the safety valve by de-energizing the electromagnet,
said additional condition responsive element comprising a temperature responsive element positioned between the rod and tube of the thermostat,
and means actuatable by said temperature responsive element for effecting closing of the safety valve.

7. In a gas flow control valve of the type embodying a thermostatic valve, an electromagnetic safety valve, and a unit including a concentrically mounted rod and tube thermostatic device for actuating the thermostatic valve, the improvements comprising
an additional condition responsive element embodied in the unit
and having means responsive to a separate condition for closing the safety valve, by de-energizing the electromagnet,
said additional condition responsive element comprising a pressure responsive piston coaxially mounted with said rod and tube thermostat,
and means actuatable by said piston effective to bring about closing of said safety valve.

8. A condition responsive device comprising
a rod and tube thermostat,
means actuated by the thermostat,
thermostatic means positioned between the rod and tube of the thermostat,
a member slidable between the rod and tube of the rod and tube thermostat actuatable by said thermostatic means,
and control means actuated by said member.

9. A condition responsive device comprising
a rod and tube thermostat
and energy supply means actuated thereby,
annularly shaped condition responsive means positioned around the tube of the rod and tube thermostat and responsive to an ambient condition,
an energy cutoff means, and means arranged to be moved in an axial direction for actuating said energy cutoff means by said annularly shaped condition responsive means.

10. A gas flow control device comprising a housing having embodied therein a manually operated valve, a thermostatic valve, a rod and tube thermostat for operating the thermostatic valve, an electromagnetic safety valve and means whereby the safety valve is responsive to a pilot burner, the safety valve including an electrical lead extending into the valve housing from the pilot burner, the improvements comprising
an additional condition responsive element concentrically positioned with respect to the rod and tube thermostat and means actuatable by the additional condition responsive element operable to physically contact said electrical lead for producing a shunt circuit to reduce the power supplied to the electromagnet whereby to cause it to release.

11. A device as in claim 10 wherein said means actuated by said additional condition responsive element comprises
a lever including a member operable to be brought into physical engagement with said electrical lead.

12. A device as in claim 10 including a pivoted lever a pivoted lever member having means to engage said electrical lead
and having a yoke straddling the tube of said rod and the tube thermostat in a position to be actuated by the additional condition responsive means.

13. A device as in claim 10 wherein said additional condition responsive means comprises
a solid thermostatic fill position between the rod and tube of the rod and tube thermostat.

14. An energy control device comprising
a probe adapted for insertion into a medium the temperature of which is to be controlled,
said probe including a first member,
means fixing one end of said first member,
the opposite end of said first member being linearly expansible away from said one end upon thermal expansion of said first member,
a second member
one end of which is connected to said first member at a location remote from said one end whereby said second member is movable with said first member upon such expansion,
said first member having a greater coefficient of thermal expansion than that of said second member,
and a third member having a greater coefficient of thermal expansion than that of said first member,
said third member having one end constrained against movement away from said one end of said first member relative to said opposite end of said first member,
said third member having a second end linearly expansible toward said one end of said first member upon thermal expansion of said third member,
said third member being correlated in dimension and coefficient of thermal expansion with the dimension and coefficient of thermal expansion of said first member such that there is a net movement of said second end of said third member toward said one end of said first member upon increase in temperature of said probe,
a first control means,
the opposite end portion of said second member being operatively associated with said first control means for operating said first control means in response to the positioning of said opposite end portion of said second member by thermal expansion of said first member,
and a second control means for overriding the effect of said first control means,
said second control means being normally inoperative,
said second end of said third member being operatively associated with said second control means for operating said second control means only upon a predetermined amount of said net inward movement.

15. In combination with a body of heated fluid, an arrangement for controlling the temperature of said fluid comprising
heater means for heating said body of fluid,
energy means for providing said heater means with energy for so heating said body of fluid,
control means for controlling the supply of energy to said heater means,
a thermostat, said thermostat including a first member of a relatively high coefficient of expansion,
said first member having
a relatively fixed end and an opposite free end,
a second member carried by said first member
and secured to said first member adjacent said opposite end thereof,
said second member having a relatively low coefficient of expansion
and being operatively connected to said control means
for operating said control means in response to the position of said second member as determined by the expansion of said first and second members occurring at predetermined temperatures for controlling said energy means to maintain said fluid at said predetermined temperatures,
a third member carried by said thermostat,
said third member being relatively fixed with respect to said thermostat adjacent said opposite end of said first member,
and having a movable end adjacent said fixed end of said first member,
said third member having a relatively greater coefficient of expansion than that of said first and said second members,
whereby when said free end of said first member moves in one direction in response to an increase in temperature in said fluid,
said movable end of said third member moves in the opposite direction in response to said temperature increase,
and cutoff means operatively associated with said movable end of said third member for cutting off said energy supply means in response to the expansion of said third member occurring at a temperature above said predetermined temperatures for shutting off said heater means and preventing overheating of said body of fluid in the event said energy supply means is not controlled properly by said control means.

16. In combination with a body of fluid, an arrangement for controlling the temperature of said fluid comprising
a first element immersed in said fluid,
said first element including
a relatively fixed portion
and a relatively movable portion,
said movable portion being movable at a predetermined rate upon expansion and contraction of said first element as determined by temperature changes of said fluid,
a source of energy for heating said fluid,
an energy control means for governing the supply of energy for heating said fluid,
said movable portion being operatively associated with said energy control means
for causing said energy control means to reduce the supply of energy upon expansion of said first unit beyond a predetermined amount,
and to increase the supply of energy upon contraction of said first unit beyond a predetermined amount,
thereby to normally maintain said fluid in a predetermined temperature range,
a second element carried by said first element,
said second element having a portion movable upon expansion and contraction of said second element as determined by temperature changes of said fluid, said portion of said second element being so movable at a greater rate than said predetermined rate of said first unit, and an energy cutoff means for cutting off said energy supply irrespective of said energy control means, said portion of said second element being operatively associated with said energy cutoff means for causing said energy cutoff means to cut off said energy supply in response to movement of said portion of said second element from an increase in temperature of said fluid beyond said predetermined range.

17. In combination with a body of fluid, an arrangement for controlling the temperature of said fluid comprising a source of energy for heating said fluid, energy control means for controlling the supply of said energy, energy cutoff means for cutting off said supply of energy irrespective of said energy control means, and operating means for operating said control means and cutoff means, said operating means including a unit received in said body of fluid and responsive to the condition thereof, said unit including a first elongated element having a relatively fixed inner end and a movable distal end, a second element attached to said first element outwardly of said inner end thereof, said second element having a relatively low coefficient of thermal expansion, said first element having a larger coefficient of thermal expansion than that of said second element, whereby said second element is movable by said first element upon expansion and contraction of said first element, said second element being operatively associated with said energy control means for governing the supply of energy therefrom in accordance with the position of said second element, thereby to maintain said fluid normally in a predetermined temperature range, said second element being movable in one direction by said first element upon expansion of said first element to reduce the supply of energy, and movable in the opposite direction by said first element upon contraction of said first element to increase the supply of energy, and a third element associated with said first and second elements, said third element having a larger coefficient of thermal expansion than that of said first element, said third element having an outer end relatively fixed against movement in said one direction with respect to said first element at a location outwardly of said inner end of said first element, said third element having an inner end operatively associated with said energy cutoff means for operating said energy cutoff means to cut off said supply of energy when said inner end of said third element is positioned inwardly at a predetermined position, said first, second and third elements being correlated in dimension and coefficients of thermal expansion such that said first element normally maintains said inner end of said third element outwardly of said predetermined position so that said energy cutoff means normally is unaffected by said third element, said inner end of said third element being movable inwardly to said predetermined position upon a rise in temperature of said fluid beyond said predetermined temperature range for shutting off said energy supply means and thereby limiting the temperature of said fluid.

18. In combination with a body of fluid, an arrangement for maintaining said fluid normally within a predetermined temperature range and at all times below a predetermined maximum temperature above said range, said arrangement comprising a supply of energy for heating said body of fluid, heater means for utilizing said energy for elevating the temperature of said body of fluid, control means for controlling the supply of energy to said heater means, energy cutoff means for cutting off the supply of energy to said heater means irrespective of said control means, and a unit immersed in said body of fluid so as to be sensitive to the temperature thereof, said unit including a first member, means fixing one end of said first member, the opposite end of said first member being linearly expansible away from said one end upon thermal expansion of said first member, a second member one end of which is connected to said first member at a location remote from said one end, whereby said second member is movable with said first member upon such expansion, said first member having a greater coefficient of thermal expansion than that of said second member, the opposite end portion of said second member being operatively associated with said energy control means for operating said energy control means in response to the positioning of said opposite end portion of said second member by thermal expansion and contraction of said first member, for thereby governing the supply of energy to said heater means and normally maintaining said body of fluid within a predetermined temperature range, and a third member having a greater coefficient of thermal expansion than that of said first member, said third member having one end constrained against movement away from said one end of said first member relative to said opposite end of said first member, said third member having a second end linearly expansible toward said one end of said first member upon thermal expansion of said third member, said third member being correlated in dimension and coefficient of thermal expansion with the dimension and coefficient of thermal expansion of said first member such that there is a net movement of said second end of said third member toward said one end of said first member upon increase in temperature of said body of fluid, said second end of said third member being operatively associated with said energy cutoff means for actuating said energy cutoff means to cut off said supply of energy upon a predetermined amount of said net inward movement occasioned by an increase in temperature of said fluid above said predetermined range.

19. A device as recited in claim 18 in which said energy cutoff means includes a valve closable to actuate said energy cutoff means, said second end of said third member being associated with said valve to effect closing thereof in response to said predetermined amount of net inward movement.

20. A device as recited in claim 18 in which said energy cutoff means includes an electric circuit, and means to interrupt said electric circuit to cause a cutting off of said energy to said heater means, said second end of said third member being associated with said means to interrupt said electric circuit to actuate the same upon said predetermined amount of net inward movement.

21. A device as recited in claim 20 in which said means to interrupt said electric circuit includes a shunt circuit connected in response to said predetermined amount of net inward movement.

22. A device as recited in claim 20 in which said means to interrupt said electric circuit includes a duality of contacts normally in engagement, and means to separate said contacts in response to said predetermined amount of net inward movement.

23. In combination with a tank for containing a liquid, an arrangement for maintaining said liquid at an elevated temperature and below a predetermined temperature limit, said arrangement comprising a source of gaseous fuel, a burner for said gaseous fuel, said burner being in juxtaposition with said tank for imparting heat to a liquid contained therein, a pilot for said burner, a thermostat valve for normally controlling the supply of said gaseous fuel to said burner, a safety valve in series with said thermostat valve, an electromagnet for holding said safety valve open in which position said safety valve allows flow of said gaseous fuel to said burner, resilient means biasing said safety valve to a closed position for shutting off said source of gaseous fuel, a thermocouple in juxtaposition with said pilot for receiving heat therefrom, said thermocouple being connected with said electromagnet for providing a flow of current energizing said electromagnet to cause said electromagnet to hold said safety valve open, said resilient means and said electromagnet when so energized exerting forces of a relationship such that said electromagnet can hold said safety valve open against the opposing force of said resilient means, and said electromagnet when so energized has insufficient force to move said safety valve from a closed poistion to an open position in opposition to said resilient means, whereby said safety valve requires manual movement from said closed position to said open position, said thermostat valve including a thermally expansible rod-and-tube element immersed in said tank and sensitive to temperatures therein, said rod-and-tube element having a space between the rod and the tube thereof, said rod-and-tube element being operatively connected to said thermostat valve for actuating said thermostat valve and normally controlling the supply of gaseous fuel to said burner, thereby to maintain liquid in said tank within an established temperature range, and cutoff means for shutting off said source of gaseous fuel irrespective of said thermostat valve, said cutoff means including a temperature-sensitive element in said space between said rod and said tube, said temperature-sensitive element being connected to said electromagnet and operable upon attaining a predetermined temperature in said tank for interrupting said flow of current to said electromagnet thereby to de-energize said electromagnet for causing said resilient means to move said safety valve to a closed position and cut off the supply of gaseous fuel to said burner.

24. In combination with a tank for containing a liquid to be maintained normally in an established temperature range and at all times below a predetermined temperature above said established temperature range, an arrangement for heating the contents of said tank comprising a source of gaseous fuel, a burner for said gaseous fuel, a pilot for said burner, said burner being in juxtaposition with said tank for imparting heat to a liquid therein, passage means interconnecting said source of gaseous fuel and said burner for conducting said gaseous fuel to said burner, and a control for said gaseous fuel, said control including a thermostat valve in said passage means for normally governing the passage of said gaseous fuel therethrough to said burner, a safety valve in said passage means in series with said thermostat valve for shutting off said source of gaseous fuel when said safety valve is closed, an electromagnet for holding said safety valve open, circuit means for energizing said electromagnet, said circuit means including a thermocouple in juxtaposition with said pilot for receiving heat from said pilot for generating current, resilient means biasing said safety valve to a closed position, said electromagnet when energized and said resilient means exerting forces such that said electromagnet will hold said first safety valve in an open position against the opposing force of said resilient means, and in which said resilient means will hold said safety valve in a closed position against the opposing force of said electromagnet, said thermostat valve including a thermally expansible rod-and-tube element in said tank and sensitive to temperatures therein, said rod-and-tube element being operatively connected to said thermostat valve for normally effecting operation of said thermostat valve and maintaining the contents of said tank within said established temperature range, temperature-sensitive means interposed between the rod and tube of said rod-and-tube element and sensitive to the temperature within said tank, and means interconnecting said temperature-sensitive means and said circuit means for interrupting said circuit means upon reaching said predetermined temperature in said tank for causing said resilient means to move said safety valve to a closed position to cut off the supply of gaseous fuel to said burner.

References Cited by the Examiner

UNITED STATES PATENTS

| Re. 24,442 | 3/1958 | Eskin | 236—21 |
| 1,981,012 | 11/1934 | Wegner | 236—21 |
| 2,273,540 | 2/1942 | Smith. | |
| 2,303,701 | 12/1942 | Mantz | 236—21 |
| 2,303,702 | 12/1942 | Mantz | 236—21 |
| 2,312,479 | 3/1943 | Ray | 236—21 |
| 2,321,852 | 6/1943 | Ray | 236—11 |
| 2,335,778 | 11/1943 | Martin-Hurst | 236—92 |
| 2,411,295 | 11/1946 | Saballus | 236—87 |
| 2,412,235 | 12/1946 | Van Denberg et al. | 236—21 |
| 2,913,182 | 11/1959 | Bryce et al. | 236—21 |

EDWARD J. MICHAEL, *Primary Examiner.*

Dedication 3,231,193.—*Charles D. Coffey*, Inglewood, Calif. AUTOMATIC GAS FLOW CONTROL DEVICE. Patent dated Jan. 25, 1966. Dedication filed Oct. 13, 1969, by the assignee, *Controls Company of America*.

Hereby dedicates to the Public the entire terminal part of the term of said patent.

[*Official Gazette January 20, 1970.*]